(12) United States Patent
Zhou et al.

(10) Patent No.: US 8,769,542 B2
(45) Date of Patent: Jul. 1, 2014

(54) SYSTEM FOR ADAPTIVE LOT SIZING IN CELLULAR MANUFACTURING FOR BALANCING WORKLOADS ACROSS MULTIPLE CELLS USING SPLIT-THEN-MERGE OPERATIONS AND EARLIEST COMPLETION ROUTE ALGORITHM

(75) Inventors: Rong Zhou, San Jose, CA (US);
Sudhendu Rai, Fairport, NY (US);
Minh Binh Do, Palo Alto, CA (US)

(73) Assignees: Palo Alto Research Center Incorporated, Palo Alto, CA (US);
Xerox Corporation, Norwalk, CT (US)

( * ) Notice: Subject to any disclaimer, the term of this patent is extended or adjusted under 35 U.S.C. 154(b) by 612 days.

(21) Appl. No.: 12/911,766

(22) Filed: Oct. 26, 2010

(65) Prior Publication Data

US 2012/0099139 A1    Apr. 26, 2012

(51) Int. Cl.
*G06F 15/00* (2006.01)

(52) U.S. Cl.
USPC .......... 718/104; 718/105; 358/1.15; 358/1.16

(58) Field of Classification Search
USPC ................ 718/104, 105; 358/1.13, 1.15, 1.16
See application file for complete search history.

(56) References Cited

U.S. PATENT DOCUMENTS

| | | | |
|---|---|---|---|
| 6,542,944 B2 * | 4/2003 | D'Errico | 710/38 |
| 6,711,607 B1 | 3/2004 | Goyal | |
| 6,856,845 B2 | 2/2005 | Fromherz et al. | |
| 6,895,292 B2 | 5/2005 | Fromherz et al. | |
| 6,993,400 B2 | 1/2006 | Viassolo | |
| 7,051,328 B2 | 5/2006 | Rai et al. | |
| 7,065,567 B1 * | 6/2006 | Squires et al. | 709/223 |
| 7,079,266 B1 | 7/2006 | Rai et al. | |
| 7,495,791 B2 * | 2/2009 | Kovnat et al. | 358/1.15 |
| 7,584,298 B2 * | 9/2009 | Klinker et al. | 709/238 |
| 7,779,416 B2 * | 8/2010 | Koga et al. | 718/105 |
| 7,814,486 B2 | 10/2010 | Papakipos et al. | |
| 7,872,767 B2 * | 1/2011 | Klassen | 358/1.15 |
| 7,904,192 B2 * | 3/2011 | Chua et al. | 700/100 |
| 8,023,133 B2 | 9/2011 | Kaneko | |
| 8,028,293 B2 | 9/2011 | Azar et al. | |
| 2005/0264832 A1 | 12/2005 | Baum et al. | |
| 2006/0101104 A1 * | 5/2006 | Bhanot et al. | 708/105 |

(Continued)

OTHER PUBLICATIONS

"FreeFlow Output Manager User Guide—Version 9.0", Sep. 30, 2010, pp. 1-368, Retrieved from the Internet: URL: http://download.support.xerox.com/pub/docs/FF_Output_Manager/userdocs/any-os/en_GB/701P50820_OutputMgr90_UserGuide.pdf, retrieved on Dec. 23, 2011 (downloaded in 5 parts: Cover to 2-46; 2-47 to 3-52; 3-53 to 4-70; 4-71 to A2; and A3 to Index pg. 8).

(Continued)

*Primary Examiner* — Meng An
*Assistant Examiner* — Abu Ghaffari
(74) *Attorney, Agent, or Firm* — Fay Sharpe LLP

(57) ABSTRACT

The present application presents a new and improved system and method of enhanced Lean Document Production (LDP), which employs cellular manufacturing concepts. The LDP process incorporates an auto-splitting algorithm and/or an earliest completion route algorithm to generate an operation schedule.

10 Claims, 11 Drawing Sheets

(56) References Cited

U.S. PATENT DOCUMENTS

| | | | |
|---|---|---|---|
| 2006/0230403 A1 | 10/2006 | Crawford et al. | |
| 2007/0177189 A1* | 8/2007 | German | 358/1.15 |
| 2007/0204226 A1 | 8/2007 | Hindi et al. | |
| 2007/0236724 A1 | 10/2007 | Rai et al. | |
| 2007/0247657 A1 | 10/2007 | Zhang et al. | |
| 2007/0247659 A1 | 10/2007 | Zhang | |
| 2008/0144084 A1* | 6/2008 | Rai | 358/1.15 |
| 2008/0300706 A1 | 12/2008 | Ruml et al. | |
| 2009/0165012 A1* | 6/2009 | Corona | 718/105 |
| 2011/0066269 A1 | 3/2011 | Zhou et al. | |

OTHER PUBLICATIONS

Kerr, R.M., "A knowledge Based, Integrated Process Planning and Scheduling Ssytem for Document Preparation", Advances in Production Management Systems, Jan. 1, 1991, pp. 497-506.

European Search Report for Application No. EP11185865, Dated Jan. 3, 2012, completed Dec. 23, 2011, Munich, DE.

Zhou, et al., U.S. Appl. No. 12/558,879, filed Sep. 14, 2009, entitled "System and Methods for Dynamic Scheduling in Cellular Manufacturing With Batch-Splitting".

* cited by examiner

ID BY REFERENCE

SYSTEM FOR ADAPTIVE LOT SIZING IN CELLULAR MANUFACTURING FOR BALANCING WORKLOADS ACROSS MULTIPLE CELLS USING SPLIT-THEN-MERGE OPERATIONS AND EARLIEST COMPLETION ROUTE ALGORITHM

INCORPORATION BY REFERENCE

U.S. Patent Application No. 20070204226, by Hindi et al., entitled, "System And Method For Manufacturing System Design And Shop Scheduling Using Network Flow Modeling"; U.S. Patent Application No. 20040225394, by Fromherz et al., entitled, "Predictive And Preemptive Planning And Scheduling For Different Job Priorities System And Method"; U.S. Patent Application Publication No. 20080144084, by Rai, entitled, "Method For Managing One Or More Print Processing Queues"; U.S. Pat. No. 7,065,567, by Squires et al., entitled, "Production Server For Automated Control Of Production Document"; U.S. Pat. No. 7,079,266, by Rai, et al., entitled, "Printshop Resource Optimization Via The Use Of Autonomous Cells"; U.S. Pat. No. 7,051,328, by Rai et al., entitled, "Production Server Architecture And Methods For Automated Control Of Production Document Management"; U.S. Patent Application Publication No. 20070236724, by Rai et al., entitled, "Print Job Management System"; U.S. Patent Application Publication No. 20070247657, by Zhang et al., entitled, "Print Job Management System"; U.S. Patent Application Publication No. 20070247659, by Zhang, entitled, "Print Job Management System"; and U.S. patent application Ser. No. 12/558,879, filed Sep. 14, 2009, by Zhou et al., entitled, "System And Methods For Dynamic Scheduling In Cellular Manufacturing With Batch-Splitting", each of the above being incorporated herein by reference in their entirety.

BACKGROUND

The present exemplary embodiment relates to lean manufacturing and to Lean Document Production (LDP). It finds particular application in conjunction with document printing operations using process friendly cells and will be described with particular reference thereto. However, it is to be appreciated that the present exemplary embodiment is also amenable to other applications.

Conventional print shops are organized in a manner that is functionally independent of the print jobs, the print job mix, and the total volume of print jobs passing through the system.

Thus, traditionally, a print shop would arrange its equipment such that all the printers are clustered in a "printers-only" area, all the inserters in an "inserters-only" area, and so on. The implication of this is that printers are only close to other printers and inserters only close to other inserters, effectively creating a separation between different types of machines that must be closely involved in order to get a single manufacturing job done. As a result, work in progress (WIP) in traditional print shops can be very high and, at the same time, the average job turn-around time is elongated. The LDP solution recognizes this "friction" in the document production process, and re-organizes the print shop layout to create process-friendly mini-shops called "cells" that eliminate much of these inefficiencies.

While the LDP solution contains an array of innovations to make document production a "lean" process, the concept of cellular manufacturing remains at the heart of this technology, and this has created a number of technical challenges, the most notable of which is how to schedule jobs efficiently in a manufacturing environment that is organized around the notion of cells. Besides the emergence of cells as new scheduling entities, there are a number of other issues that pose additional challenges to schedulers employed in LDP systems.

One issue is the heavy-tailed job size distribution, which refers to the fact that print jobs (especially the ones found in large print shops) vary significantly in sizes such that their distributions can no longer be sufficiently characterized by any "textbook" distributions (such as normal or exponential distributions) that have a finite variance. Given that many scheduling algorithms and systems assume quite the opposite (i.e., only dealing with distributions that are not heavy-tailed), new schedulers are needed to meet this challenge.

Existing schedulers take the form of a two-tiered scheduling approach in which a job is first assigned to a cell (or a sequence of cells if needed) by a shop-level scheduler, and since each cell has its own job queue, once a job is assigned to some cell, it is permanently bound to that cell until the job steps within the cell are finished. This strategy works well if the shop-level scheduler can accurately predict the workload of each cell at any moment and compute a mapping from jobs to cells in a way that keeps the utilization level of each cell as high (or evenly distributed) as possible. With current schedulers, however, there are situations in which this can be difficult to achieve. One reason is that the shop-level scheduler does not take into account detailed scheduling constraints within each cell while making its decisions. Factors such as the specific arrival and due dates of a job, the sequence-dependent setup costs, and the number of jobs with similar due dates scheduled in a single cell are not addressed by the shop-level scheduler. Obviously, all these unaddressed factors can (and usually do) contribute to the workload of a cell at any given time. Thus, any such fixed mapping from jobs to cells tends to overload some cells while leaving others idle from time to time.

Another area where improvements of existing LDP systems would be beneficial is in the area of "batch-splitting", which is a throughput-improvement strategy for handling large jobs in LDP systems. Batch-splitting chops a long job into a number of smaller units called "batches." At times batches may also be referred to as sub-jobs. The idea is to eliminate downstream waiting as soon as a fraction of a long job is ready to flow through the system.

In existing LDP solutions, the lot size is calculated in two different ways, depending on the type of workflow (i.e., serial or assembly). Improving the efficiency of batch-splitting in these situations would, therefore, be beneficial. The present application addresses these and other issues.

BRIEF DESCRIPTION

The present application presents a new and improved system and method of enhanced Lean Document Production (LDP), which employs cellular manufacturing concepts. The LDP process incorporates an auto-splitting algorithm and/or an earliest completion route algorithm to generate an operation schedule.

DETAILED DESCRIPTION

The disclosed embodiments contemplate the use of a lean production process server (LPPS) or other electronic processor running appropriate software to act as a scheduler for coordinating production of document processing jobs in a document factory (such as a print shop). The server exploits lean production techniques to control document processing jobs, and can be run on a number of different platforms, including but not limited to, UNIX and Windows ("UNIX" is a registered trademark of the Open Source Group, while "Windows" is a registered trademark of Microsoft Corporation) based-platforms. The server determines workflow priorities and manages workflow accordingly. Those skilled in the art will appreciate that the presently disclosed embodiments may also be practiced with platforms that run other varieties of operating systems. Moreover, the server need not run on a dedicated computer system but rather may run on another variety of electronic devices, such as a printer, copier, etc. Workflow priorities for document processing jobs can be determined by observing the various jobs processing units.

At least one illustrative embodiment disclosed herein presumes that the document factory has been partitioned into autonomous cells. Each cell is a logical grouping of resources in the document factory that is sufficient for completing at least one type of document processing job. Thus, a first cell may include a printer and binder whereas a second cell may include a copier and a collator. The LPPS is responsible for distributing document processing jobs among such cells in an efficient manner.

Figure 1:
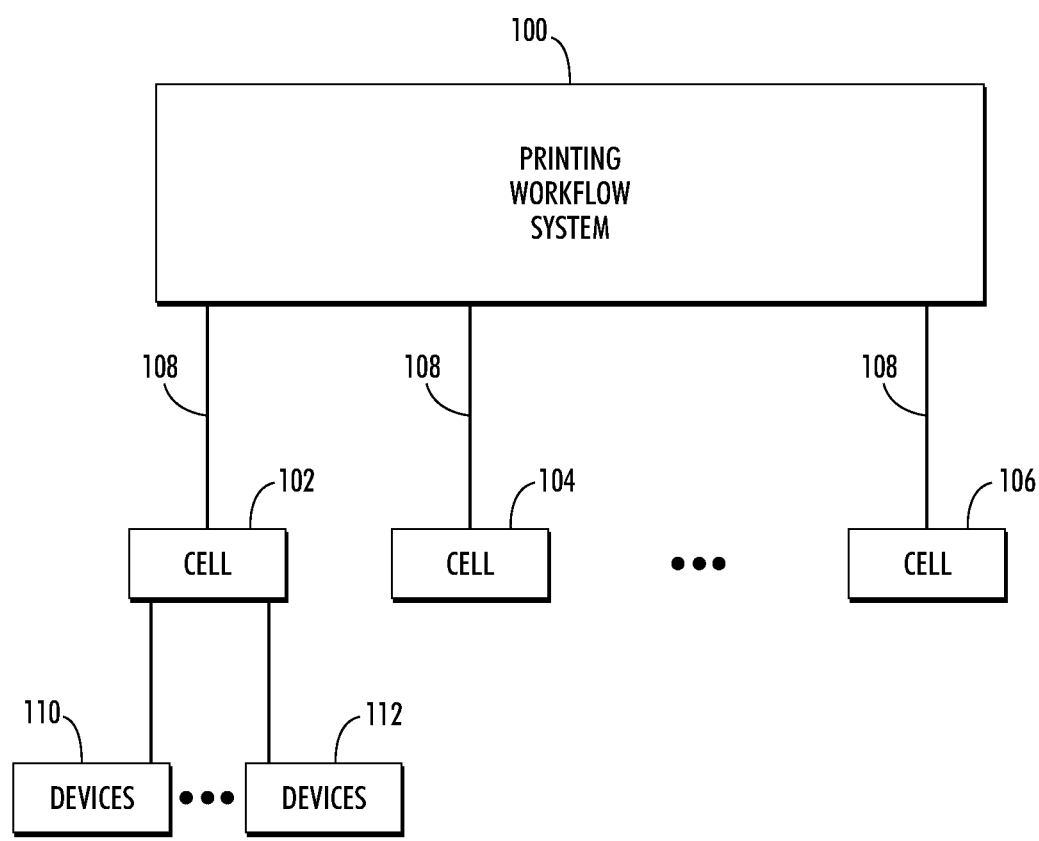
FIG. 1 is a block diagram illustrating a print workflow system in combination with cells and their corresponding devices.

Referring to FIG. 1 a printing workflow system 100 in a print shop (i.e., a document factory) is shown. The printing workflow system 100 which includes at least one processor, such as an electronic processor configured to operate software, controls a multitude of cells 102 through 106, and sends information to and receives information from the cells 102 through 106 via communication links 108. The cells 102 through 106 are comprised of at least one device for assisting in completing a document processing job of given product-types. For example, printing device 110 could be a 600 dpi monochrome printer, while printing device 112 could be a 1200 dpi color printer. These of course are only examples and many other processing devices may be within a cell.

Figure 2:
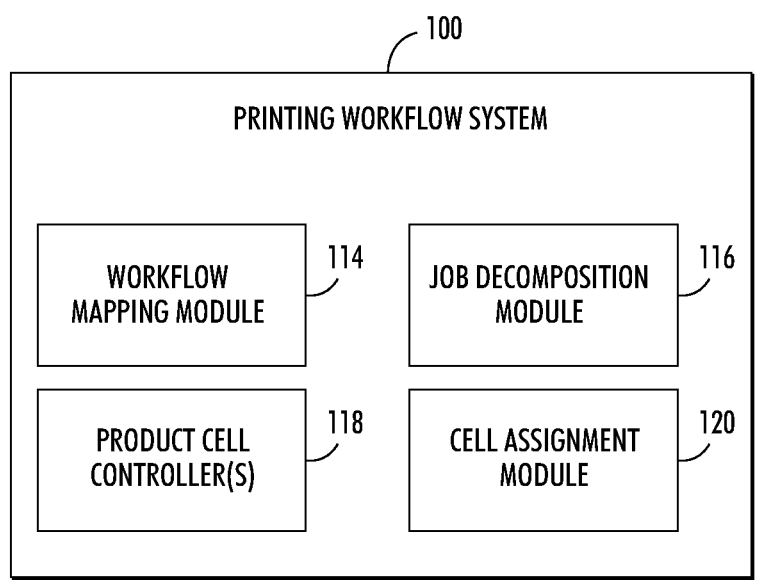
FIG. 2 is a block diagram including software components employed in the print workflow system of FIG. 1.

Referring to FIG. 2, several of the types of modules which may be employed in printing workflow system 100 are shown. These modules include a workflow mapping module 114 that determines the workflow for selected document processing jobs. The workflow module, among other things, identifies the operational steps needed to complete a document processing job, and the sequence in which these operational steps should be performed. A job decomposition module 116 is included for splitting the document processing jobs into batches (also called herein as lots) or sub-jobs and for sending the batches to cells for completion. A product cell controller (PCC) 118 may be provided at given cells for receiving at least one batch to be processed by a device in the cell. Lastly, a cell assignment module 120 is provided for assigning batches to be processed by a cell.

In general, a print job is received, and a workflow is developed for the print job by workflow mapping module 114. Job decomposition module 116 may split the job into batches, with the batches or job then being assigned to cells (e.g., 102 through 106) for completion by cell assignment module 120. The batches may be sent to product cell controller 118 of the assigned cells, where each batch may be further sub-divided.

Figure 3:
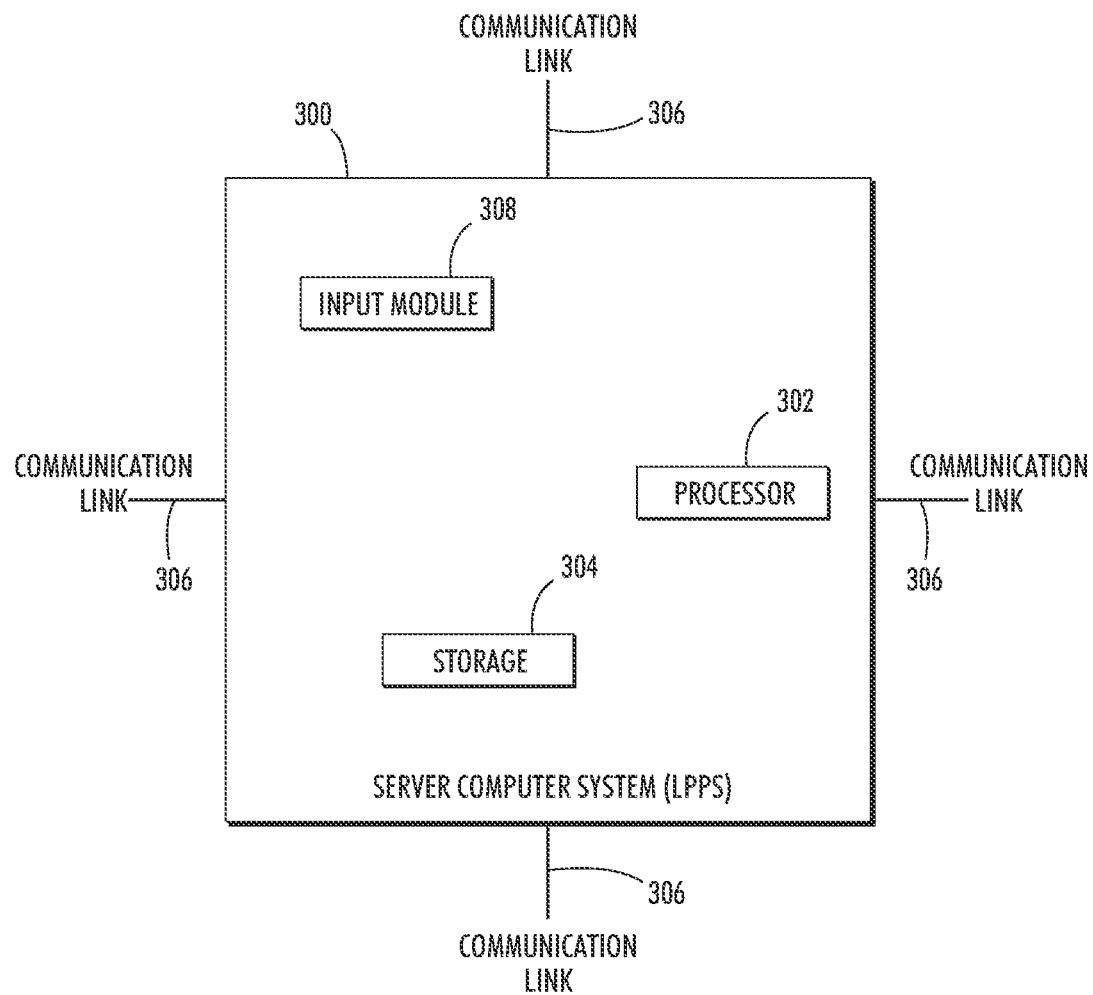
FIG. 3 is a block diagram of a server employing the printing workflow system of FIG. 1.

Referring to FIG. 3, illustrated is one example of a server 300 (i.e., LPPS) suitable for use in printing workflow system 100. Server 300 includes a processor 302, a memory storage 304, communication links 306, and an input module 308. The input module 308 is used to receive input from various devices via communications links 306. The input module 308 receives the document processing jobs on behalf of server 300. The processor 302 executes the programming instructions on server 300 to manage document processing jobs. The server 300 stores the instructions in storage 304. For example, data of modules 114, 116, and 118 (of FIG. 2) and other data may be stored in storage 304. Data of module 120 may be executed on server 300 or a separate server that is particular to a cell.

Figure 4:
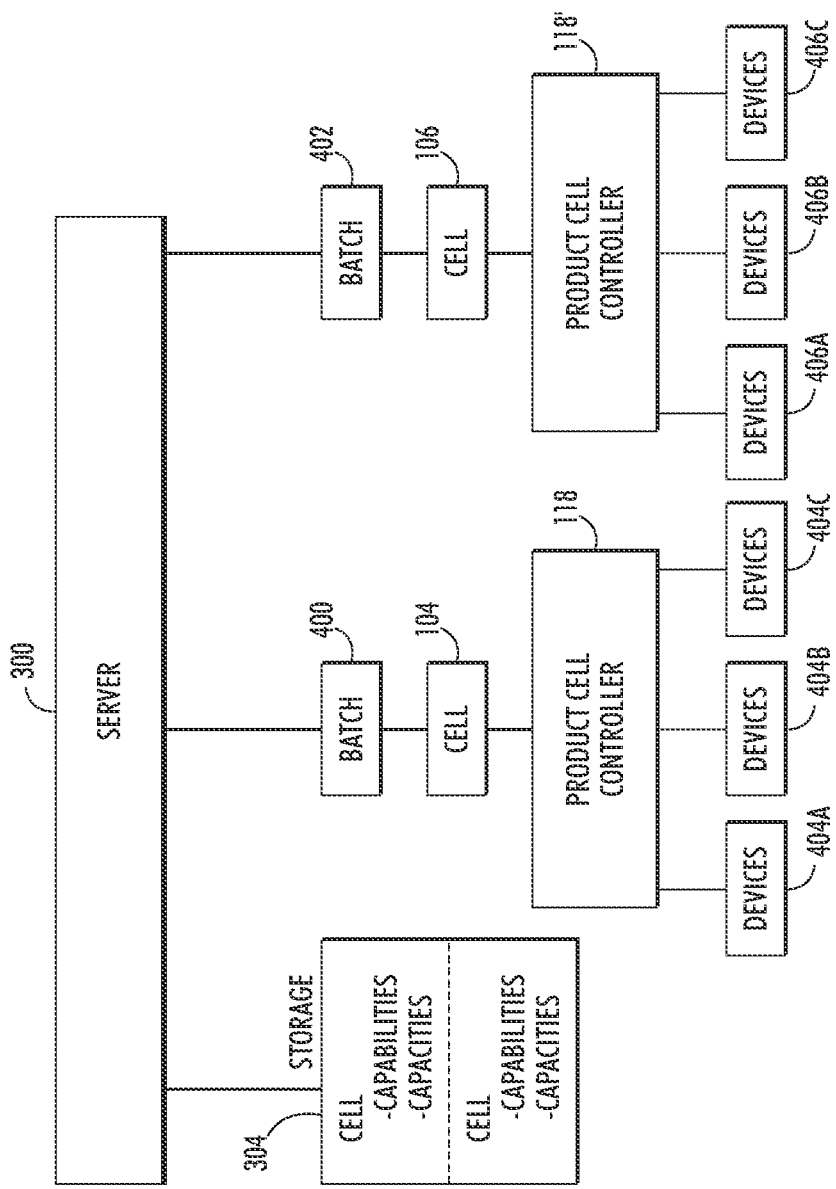
FIG. 4 is a block diagram illustrating how the print workflow system is used to accommodate the splitting of a document processing job into sub-jobs.

Referring to FIG. 4, shown is an arrangement with server 300 of printing workflow system (such as printing workflow system 100 of FIG. 1) interacting with cells (e.g., 104 and 106 of FIG. 1) of a production system. The product cell controller 118 for the cell receives batches 400, 402 from server 300 to be further processed by cells 104,106. Server 300 stores, in storage 304, the capacities and capabilities of each cell in the print shop to produce different product-types. For example, cell 104 in the network may produce three different types of documents and cell 106 may produce two types of documents. It is mentioned that it is quite possible that two different cells can produce similar, or even the same, document types (i.e., a document type is uniquely characterized by the sequence of processing steps to completely finish the document). Server 300 stores this information to determine which cell has the capabilities to process a document job. The capacity of each cell is also stored to determine the volume of a particular product-type that a cell can produce.

As stated above, the job decomposition module 116 may split a document processing job into batches for transmission to various autonomous cells for processing. To the extent a cell in the network is autonomous, it can process a job completely. In the example shown in FIG. 4, a document processing job is split into batches 400 and 402 that are sent to cells 104 and 106, respectively. The product cell controllers 118 and 118' send the batches 400, 402 to device set 404A-404C and device set 406A-406C, respectively, for processing.

Figure 5:
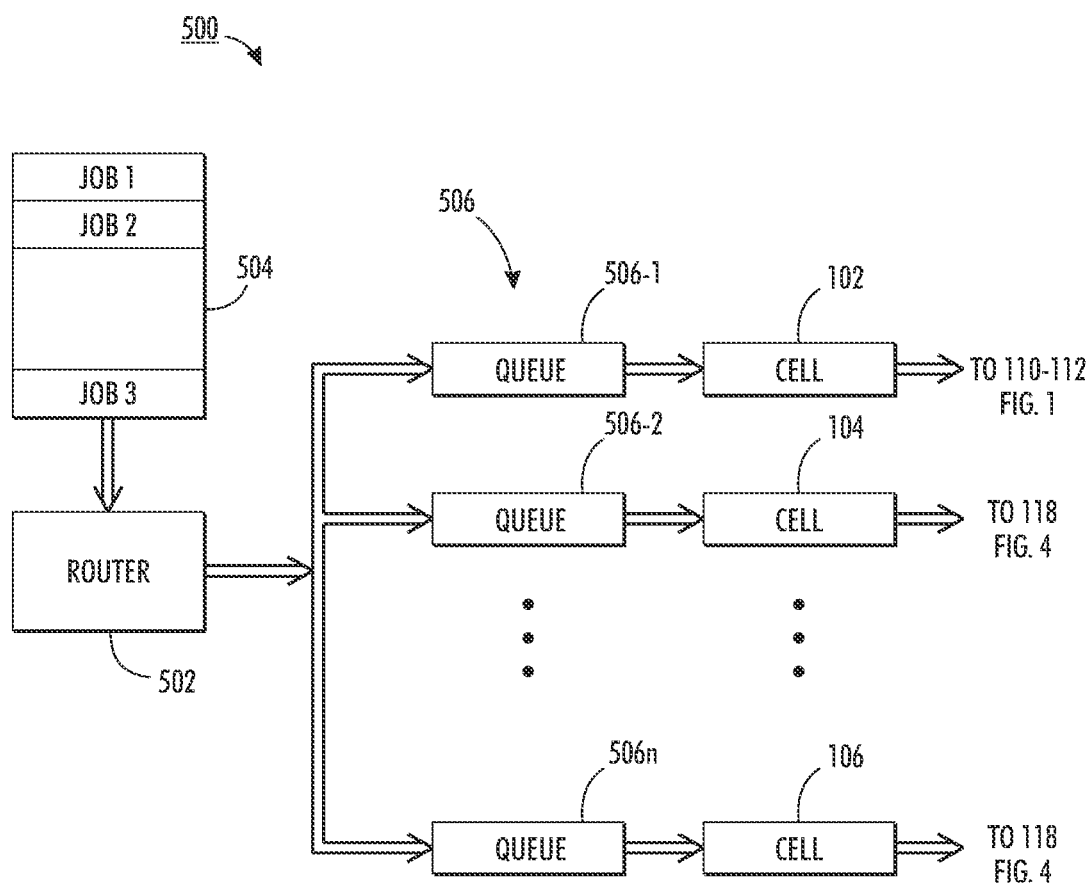
FIG. 5 is a block diagram illustrating an approach for routing jobs to cells by way of a corresponding series of queues.

Referring to FIG. 5, a simplified version of a job routing system 500, for use with the present embodiments, is illustrated. Router 502, which communicates with a bank of stored jobs 504, may include at least some of the job management capabilities associated with cell assignment module 120 (FIG. 2) and the LPPS 300 (FIG. 3). The router further communicates with a series of print processing related queues 506 (designated as 506-1, 506-2, ... 506-n), which queues, in turn, are respectively operatively associated with cells 102 through 106.

As previously discussed, a particular throughput-enhancement strategy in this area is lot sizing (aka, batch-splitting), which chops a large job into a number of smaller units called "lots" (at other times called herein batches, or sub-jobs). The idea is to eliminate downstream waiting as soon as a fraction of a long job is ready for further processing. In the existing LDP solution, the lot size is calculated in two different ways, depending on the type of the workflow (serial or assembly).

Figure 6:
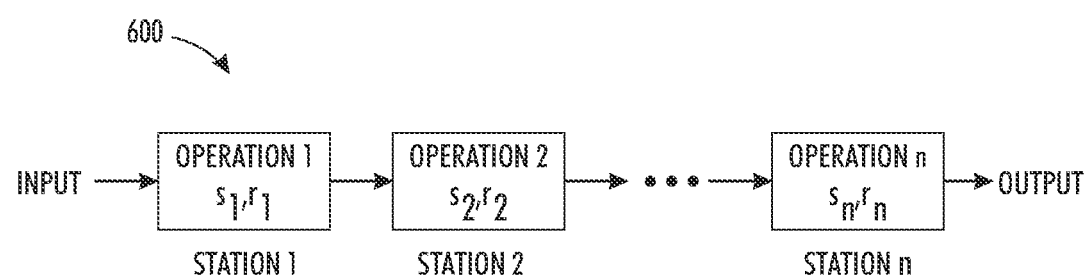
FIG. 6 illustrates a serial workflow involving n operations.

With attention to the concept of workflow, FIG. 6 shows a serial workflow 600 with n operations (i.e., Operation 1-Operation n) that must be performed sequentially at corresponding stations (Station 1-Station n), where each Station includes previously mentioned resources (e.g., printers, binders, copiers, collator, etc.) needed to complete a job or portion thereof. Each operation has a processing time of $r_i$ time units per production item. To switch between processing one lot to the next, flow 600 needs a setup time of $s_i$ units per production item.

The total size of the job is defined as N items and the lot size is b items. The total makespan is given by the following formula:

$$T(b)=s_1+(r_1+r_2+\ldots+r_n)b+(N/b-1)\max\{s_1+r_1b, s_2+r_2b, \ldots, s_n+r_nb\} \quad (1)$$

Because T is a function of the lot size b, the optimal lot size is the one that minimizes T. This minimum can be found as follows:

1. Compute the set of integers bs that divide N exactly;
2. Evaluate T(b) for all the bs in this set, and store these values in a vector; and
3. Select the minimum component of this vector. The b corresponding to this component is the optimal lot size.

Figure 7:
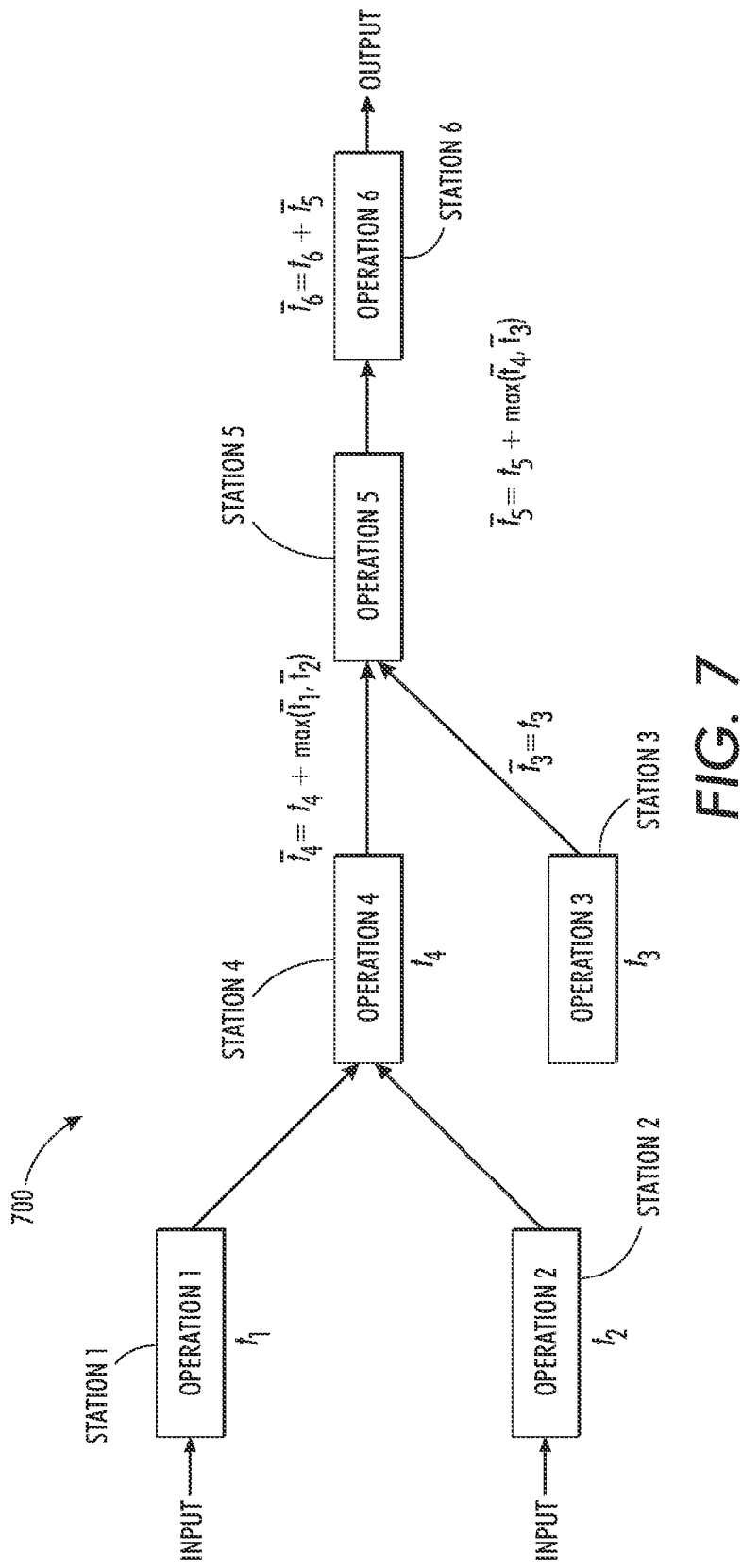
FIG. 7 illustrates an assembly workflow involving six operations.

For assembly workflow, the calculation of optimal lot size is more involved. FIG. 7 shows an example of a job being processed by an assembly workflow 700 that involves six operations (Operation 1-Operation 6), some of which are performed in parallel (e.g., Operations 1 and 2) and some of which are performed sequentially (e.g., Operations 5 and 6). It is to be understood while six operations are shown, this number is provided just as an example, and the present concepts are equally applicable to workflows having other numbers of stations and operations.

Figure 8:
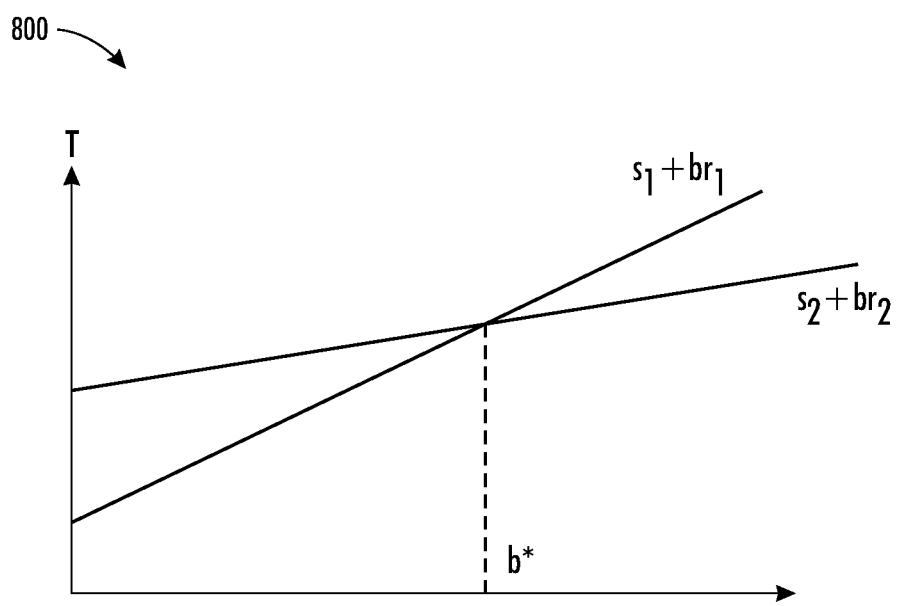
FIG. 8 presents a graph showing critical path changes with respect to lot size.

Unlike the serial case, there is no closed-form formula for computing the optimal lot size for assembly workflows, because the total makespan depends on the critical path (i.e., path with the maximum production time), which can change from one lot size to another. To see this suppose there are two stations having setup times $s_1$, $s_2$ and unit processing times $r_1$, $r_2$, respectively. Their processing times for a lot with size b are $s_1+br_1$ and $s_2+br_2$, respectively. As shown in chart 800 of FIG. 8, if $b<=b^*$, then $s_1+br_1<=s_2+br_2$, which means station 2 is on the critical path, but if $b>b^*$, then $s_1+br_1>s_2+br_2$, which means station 1 instead of station 2 is on the critical path.

A current LDP scheduler uses the following strategy to determine the critical path dynamically. Let $t_i=s_i+br_i$, $i \in \{1, 2, \ldots, m\}$ denote the total processing time of a lot with size b on station i. Furthermore, let $\bar{t}_i=t_i+\max_{j\in P_i} t_j$, where $P_i$ is the set of upstream stations of station i. Then $\bar{t}_i$, $i \in \{1, 2, \ldots, m\}$ is the elapsed time for processing a lot through station i. Therefore, $\bar{t}_m$ which is the elapsed time for a lot (or batch) to be processed through the last station in the line is the total turn-around time of a lot (or batch) with size b determined by the critical path. In addition, each station keeps track of the upstream branch that gives the maximum processing time so far, which determines the critical path. Then, for every possible value of b, the existing LDP scheduler calculates T(b) determined by previously described Equation (1) using the stations in the critical path identified through the process mentioned above. The optimal lot size is then the one that minimizes T(b). It is to be noted that there is no need to calculate T(b) every time b changes, as T(b) only needs to be re-evaluated if a change in lot size b triggers a change in the critical path.

As outlined above, the process with which to determine the optimal lot size in the existing LDP scheduler is rather involved, especially for assembly workflows, which are the most general type. But more importantly, the real optimal lot size can differ significantly from the value computed by the above process. This is due to the implicit assumption that all the stations used along the way must be idle before the first lot is processed. Unfortunately, this holds true for only few jobs that are submitted when the shop is mostly idle. For busy shops, jobs submitted later must compete with the ones submitted earlier that are still being processed. In the worst case, lot sizing may not lead to any reduction in makespan if all the machines are already fully occupied. On the contrary, it may increase the makespan, since multiple setup times are needed for different lots that belong to the same job.

Another limitation of the current lot sizing formula is that it relies on process rate aggregation to handle the case in which multiple machines are available for processing a single job step. In LDP, it is common to have a single cell equipped with multiple printers and/or inserters to achieve desired throughput. This violates the assumption in Equation (1) that each process stage i can only have a single setup time $s_i$ and processing rate $r_i$. To fix this problem, the existing LDP scheduler adds up the processing rates of all the machines in the same cell that can perform the same function (or function sequence). While this ensures the same formula remains applicable to cells with multiple parallel machines, it also ignores the fact that multiple slower machines are not the same as a single high-speed machine in many circumstances.

Figure 9:
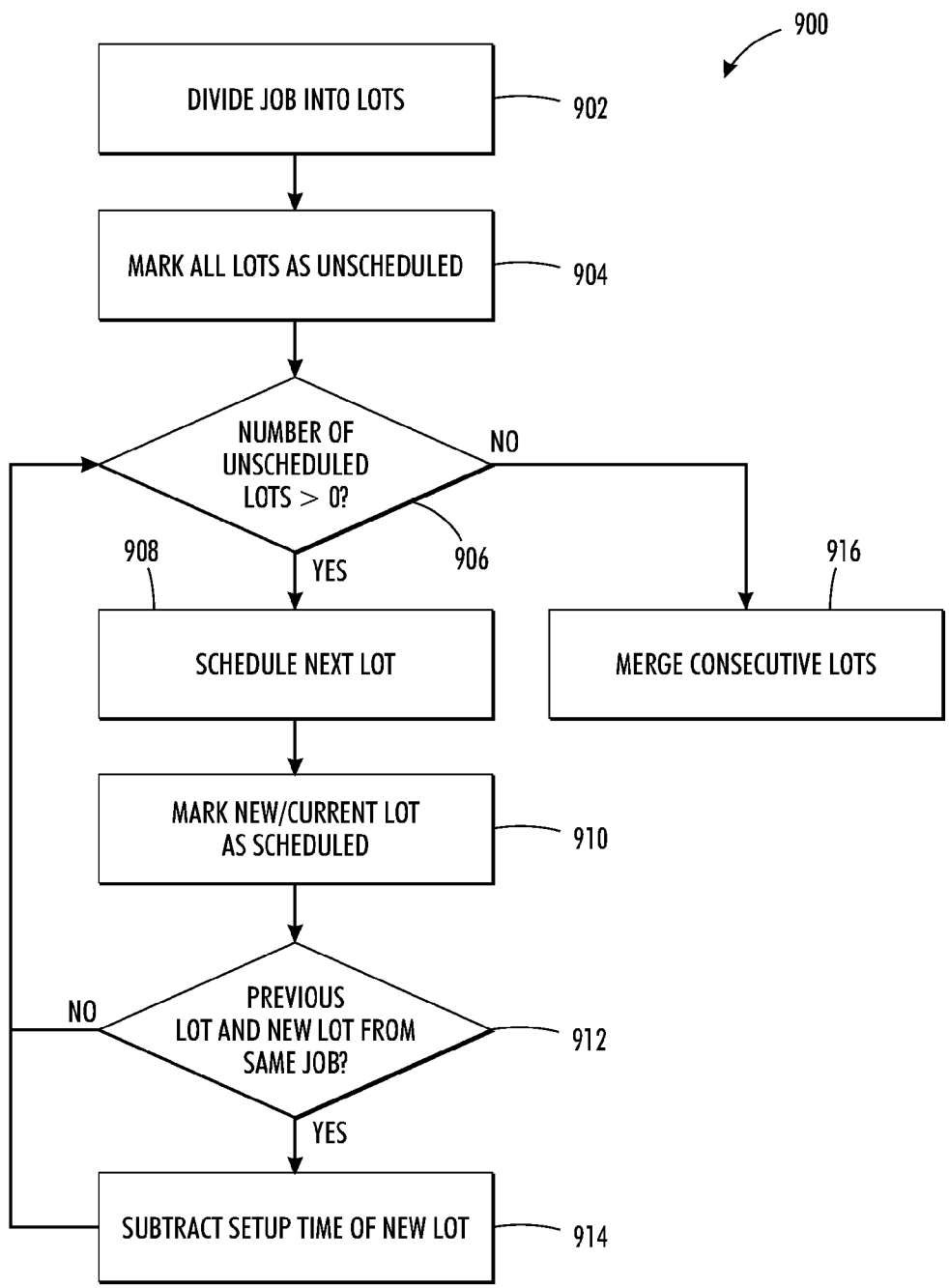
FIG. 9 is a flow diagram for merging lots.

The to-be-described system and method, which is free from the above limitations, does not use any fixed formula to determine the "optimal" lot size, because any such statically computed lot size would fail to adapt to a scheduling environment as dynamic as a real print shop. Instead, and as depicted in flow diagram 900 of FIG. 9, the present system and method divides a large job into many small lots (batches or sub-jobs) and schedules them one at a time. Once all lots are scheduled, a merge phase is used to determine which lots can be combined with others to form larger lots. Thus, the final schedule does not suffer from having too many tiny lots. In fact, it can be shown that in the (rare) event in which a job should not be further divided into anything more than a single lot, the present system and method will find the optimal lot size. FIG. 9 is a high level flow 900 defining steps (which will be expanded upon) to accomplish the above. Thus, process flow 900:

1. Divides a job into a sufficiently large number of lots (or the maximum number of lots allowed, which may be predefined in the system) (902);
2. Marks all lots as unscheduled (904);
3. Enters a loop while (the number of unscheduled lots >0) (906), wherein the loop process:
   a. Schedules the next lot (908);
   b. Marks the new/current lot as scheduled (910); and
   c. Determines if the previous lot and the new (or next) lot on the same machine belong to the same job and is scheduled back to back with the current lot (if "no", the process returns to step 906); if yes, the process continues (912); and d. Subtracts the setup time of the newly scheduled lot (914); and 4. When the loop ends (i.e., step 906 is "no"), consecutive lots that are scheduled on the same machine are merged (916).

It is understood that in at least one embodiment the use of "sufficiently large" is understood to mean a lot size which is dictated by naturally imposed constraints. Also, two lots are consecutive if and only if they are scheduled back to back and belong to the same job.

Figure 10:
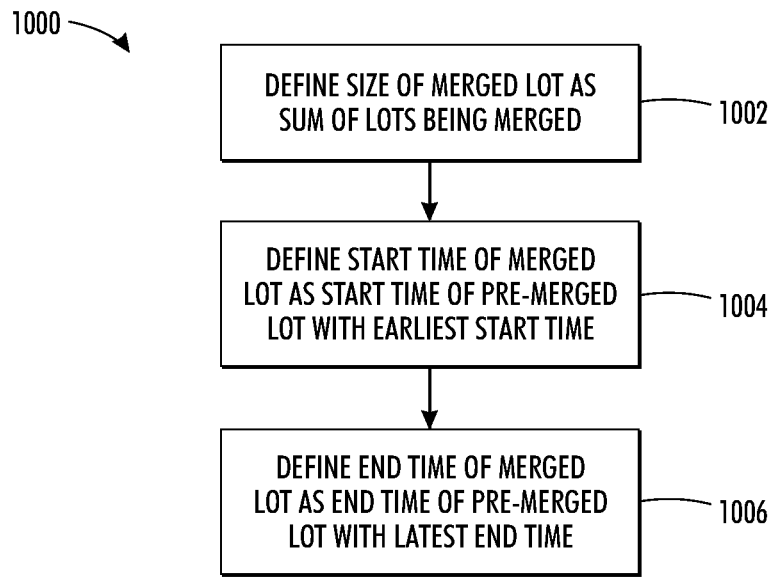
FIG. 10 expands on what occurs when a merging takes place.

As shown by flow diagram 1000 of FIG. 10, when merging two consecutive lots, the following steps are performed to define the merged lot:

1. The size of the merged lot is the sum of the sizes of the two lots being merged (1002);
2. The start time of the merged lot is the start time of the lot that is scheduled to begin earlier (1004); and
3. The end time of the merged lot is the end time of the lot that is scheduled to end later (1006).

Of course, merged lots can be further merged with other merged or unmerged lots. A schedule is maximally merged, if and only if no consecutive lots can be found that are scheduled on machine i for all $i \in \{1, 2, \ldots, m\}$.

Because this algorithm returns only schedules that are maximally merged, this causes the algorithm to not create more lots than necessary, because a maximally merged schedule contains as few lots as possible to complete the job. For example, if all but one machine is busy, the algorithm will discover in the merge phase that all the lots are scheduled back to back on the same machine that has been idle and will thus merge all of them into a single lot, which only needs a one-time setup instead of multiple setups. Although cases like this are not particularly common, they do happen from time to time. Since a single-lot schedule is a just special case of a maximally merged schedule in which all lots can be merged, the new algorithm handles the case without difficulty. The described algorithm may be called an auto-splitting algorithm, because it automatically adapts the lot size to the changing workload of cells.

For jobs with workflows that must involve multiple cells, the auto-splitting algorithm described above is used in a scheduler that can do scheduling across the cell boundary. Thus, also described herein is a computationally efficient way to conduct inter-cell scheduling in LDP. It is to be understood, however, the present teaching may also be applied to other embodiments of cellular manufacturing.

A particular aspect to efficient multi-cell scheduling is to identify a "shortest route" to connect different cells that must collaborate to get a job done. Finding such a route can be challenging because the objective is not just to minimize the number of cells involved, but more importantly to minimize the time spent in these cells. To this end, the present disclosure has developed an earliest-completion scheduling strategy 1100 (FIG. 11) to identify the most efficient route. The algorithm works as follows:

1. First, it enumerates all routes that have the minimum number of inter-cell hops (1102);
2. Then for each route in this set, it tries to find the best schedule by only using those cells identified by the route (1104); and
3. Then it selects the route and the corresponding schedule that finishes the job the earliest is selected (1106).

Expanding on the above, first described is the route enumeration algorithm, which is called herein the min-hop-route enumeration algorithm, since it returns the set of routes for completing a job that requires the minimum number of inter-cell hops. In this discussion, "steps" is the total number of steps of a job and "h" is the number of inter-cell hops needed by the job. Note that h is no less than the number of cells involved in the workflow minus one, but it can be greater, if a single cell is visited more than once and in between these visits yet another cell is visited along the way (e.g., first cell A, then cell B, then cell A again). The reason for using the number of inter-cell hops instead of the cardinality of the set of cells visited is to more accurately account for the cost of inter-cell workflow coordination such as Work In Progress (WIP) transfer across cell boundaries. Shown in FIG. 12 are steps of the min-hop-route enumeration algorithm 1200 for enumerator steps 1102 and 1104 of FIG. 11. In this arrangement, the system will:

1. Set $h_{max}$ (a hypothetical upper bound on inter-cell hops) to be 0 (1202);
2. Loop while ($h_{max}$<Steps) (1206);
   a. Let $R_{min-hop}$ be the set of all routes with inter-cell hops smaller than or equal to $h_{max}$ that can complete the job (1206);
   b. If $R_{min-hop} <> \phi$ then exit loop (1208);
   c. Otherwise $h_{max} = h_{max} + 1$ (1210);
3. If $R_{min-hop} <> \phi$ then return $R_{min-hop}$ as the set of min-hop routes (1212); and
4. Otherwise report error (i.e., the present job requires one or more capabilities missing in the shop) (1214).

The enumeration algorithm 1200 outlined above uses an iterative-broadening strategy to gradually relax the route enumeration criterion. Since the maximum number of inter-cell hops is bounded from above by Steps (the total number of job steps) minus one, the algorithm is designed to find at least one route if all the capabilities required by the job are present somewhere (not necessarily in a single cell) in the shop. On the other hand, since it tries out routes with fewer inter-cell hops first, it is also designed to find $R_{min-hop}$, the set of min-hop routes, if there exists at least one feasible route.

Figure 11:
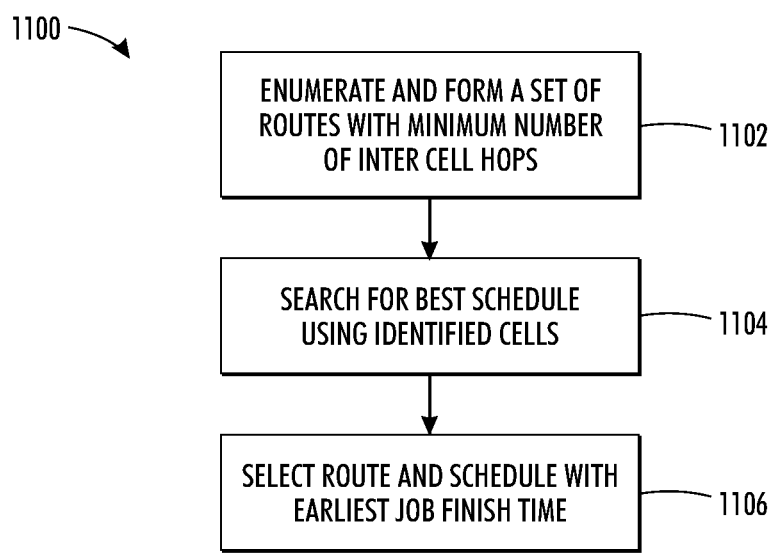
FIG. 11 is an earliest completion scheduling system and method.
Figure 12:
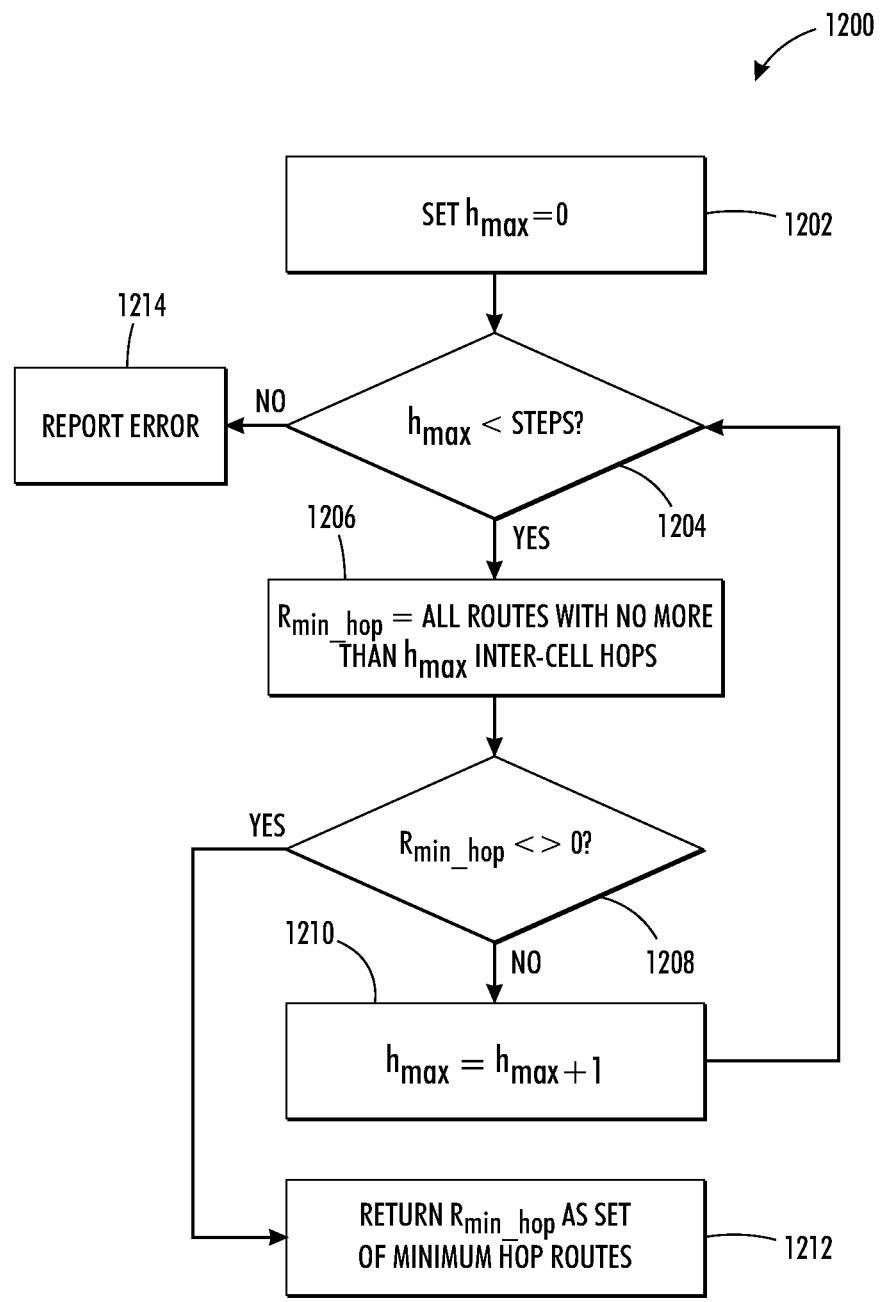
FIG. 12 is a route enumeration flow diagram.

Once the set of min-hop routes is found, the inter-cell scheduling algorithm tries to find the best possible schedule for each $r \in R_{min-hop}$ and selects the route r* that completes the job the earliest (i.e., step 1106 of FIG. 11). Thus, this algorithm may be called an earliest-completion-route scheduling.

Compared to existing formula-based algorithms, which are static, the auto-splitting algorithm of this embodiment is fully dynamic and adaptive to real-time cell workload. In particular, it:

1. Does not use a static formula;
2. Is applicable to both serial workflows and assembly workflows (i.e, no separate treatments for different types of workflows), which leads to simplified code;
3. Requires no assumption about machines being initially idle; and
4. Has no need for rate aggregation, which creates artificial processing rates (as the sum of the processing rates of individual machines) that can lead to poor scheduling quality.

In experiments, performance of the described auto-splitting algorithm was evaluated on a number of different sized print shops, including Shop A (mid size), Shop B (mid size), and Shop C (large size) shops. For Shop A (mid-size), auto-splitting was found to be better than the static approach in terms of all major scheduling metrics including number of late jobs (reduced from 637 to 560), average lateness (reduced from 773 to 738), and average turn-around time (reduced from 934 to 899). For Shop B (mid-size), auto-splitting reduced the number of late jobs from 1 to 0, average lateness from −137 to −150 (smaller is better), and average turn-around time from 20.46 to 7.62. For Shop C (large size), which is a large shop, both approaches were able to find schedules that do not have any late jobs, but auto-splitting reduces the average turn-around time from 1.79 to 0.84 as well as average processing time from 1.07 to 0.61.

Since a particular innovation here is dynamic lot sizing, one can detect differences from static lot sizing by observing if the lot size changes under different workload and various scheduling constraints such as due dates. In the static approach, such changes will not trigger any substantial changes in lot size, although the productivity of the print shop will fluctuate under various conditions. But for dynamic lot sizing using auto-splitting, all these factors can and usually will have an impact on the lot size, which can be observed without needing the source code of the scheduler.

For the earliest-completion-route scheduling, a similar approach can be used to determine if a dynamic route-selection algorithm is being used or not, since which route is the "shortest" depends on the workload of all the cells and other scheduling constraints in earliest-completion-route scheduling; whereas the previous static approach always chooses the same route no matter how busy the cells are. Again, there is no need to have access to the source code to detect this scheduling behavior.

A variation of the described route enumeration algorithm is to continue enumerating feasible routes even after all the min-hop routes have been found, because routes with the fewest number of inter-cell hops are not necessarily the "shortest" in terms of overall processing time for completing a job. Furthermore, the route enumeration algorithm, as it is presented herein, does not take into account the neighborhood of a cell (e.g., cell A is close to cell B, but not to cell C). In another embodiment of the route enumeration algorithm, penalties (or rewards) are added to a particular route if it connects two distant (or neighboring) cells in the same workflow.

The present application describes a number of enhancements to the existing LDP scheduling algorithm that have modest computational complexities yet are effective in reducing both the number of late jobs and the average turn-around times, among other quality metrics. Given the generality of the scheduling framework used, the present concepts can be applied to other fields including car manufacturing, supply chain management, among others.

The present application also includes a system that utilizes the aforementioned methods to achieve improved scheduling performance for cellular manufacturing with batch-splitting. The system also may include parallel implementations of the earliest-completion-route algorithm and/or the dynamic lot/batch (auto-splitting scheduling algorithm for improved system performance. Whereas by parallel, it is understood that the auto-splitting operations and earliest-completion-route operations may be processed in parallel by two core processors in order to return a most optimal schedule.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

The invention claimed is:

1. A method of balancing workload across multiple cells in a cellular manufacturing environment, the method comprising:

compiling a listing of a plurality of jobs and a plurality of cells, wherein the plurality of jobs are to be produced by at least some of the plurality of cells, and each of the cells include at least one production device; and auto-splitting the jobs, wherein the auto-splitting includes:

dividing the jobs into smaller sized lots;

scheduling the smaller sized lots to various ones of the cells one lot at a time, wherein the scheduling includes assigning the smaller sized lots of the jobs to the cells using an earliest-completion-route algorithm, which includes enumerating a set of feasible routes for each specific job of the plurality of jobs that has a minimum number of inter-cell hops, finding the best schedule by only using those cells identified by the corresponding route and selecting the route and corresponding schedule that finishes the specific job taking into account at least one of production throughput and wait times;

determining, once all the smaller sized lots are scheduled, which of the smaller sized lots can be combined with other ones of the scheduled smaller sized lots to form larger lots; and merging together the smaller sized lots determined to be combinable as consecutive lots of the same job, wherein this method is performed by use of at least an electronic processor.

2. The method according to claim 1, wherein the auto-splitting is performed without a fixed formula to determine an optimal lot size.

3. The method according to claim 1, wherein a setup time for a newly scheduled lot is subtracted from a set-up time when a previously scheduled lot and the newly scheduled lot are consecutive and are merged.

4. The method according to claim 3, wherein two of the lots are consecutive if and only if the two lots are scheduled back to back and belong to the same job.

5. The method according to claim 4, wherein when the two consecutive lots are merged:

a size of the merged lot is the sum of the sizes of the two lots being merged, a start time of the merged lot is the start time of the lot that is scheduled to begin earlier, and an end time of the merged lot is the end time of the lot that is scheduled to end later.

6. The method according to claim 1, wherein a schedule is maximally merged when the schedule contains as few lots as possible to complete the job.

7. The method according to claim 1, wherein the auto-splitting automatically adapts the lot size to changing workloads of cells.

8. A method of balancing workload across multiple cells in a manufacturing environment, the method comprising:

compiling a listing of a plurality of jobs and cells, wherein the plurality of jobs are to be produced by at least some of the plurality of cells, and each of the cells include at least one production device;

performing auto-splitting operations to divide the jobs into smaller sized lots, wherein the auto-splitting operations use split-then-merge operations to adapt the lots to cell workloads while returning lot sizes that are optimized for the cell to which the lots are to be assigned;

enumerating a set of feasible routes for a specific job of the plurality of jobs in the manufacturing environment using an iterative broadening strategy to gradually relax route enumeration criterion, starting with trying out routes for the specific job having fewer inter-cell hops first;

assigning the specific job to the cells using an earliest-completion-route algorithm, wherein the specific job is assigned to the cells that provide an earliest completion time for the specific job; and generating a job schedule for job production of the specific job based on the results of the auto-splitting operations and the earliest-completion-route algorithm which are performed in parallel, wherein the method is performed by use of at least an electronic processor.

9. The method according to claim 8, further including a penalty for routes that connect distant cells in the same workflow and a reward for routes that connect neighboring cells in the same workflow.

10. A method of balancing workload across multiple cells in a cellular manufacturing environment, the method comprising:

compiling a listing of a plurality of jobs and cells wherein the plurality of jobs are to be produced by at least some of the plurality of cells, and each of the cells include at least one production device;

performing auto-splitting operations to divide the jobs into smaller sized lots, wherein the auto-splitting operations use split-then-merge operation to adapt the lots to cell workloads while returning lot sizes that are optimized for the cell to which the lots are to be assigned;

assigning the jobs to the cells using an earliest-completion-route scheduling strategy, wherein the earliest-completion-route scheduling strategy includes:

enumerating a set of feasible routes for a specific job of the plurality of jobs that all have a minimum number of inter-cell hops;

for each route in this set, finding the best schedule by only using those cells identified by the corresponding route; and selecting the route and the corresponding schedule that finishes the specific job earliest; and generating a job schedule for job production based on the results of the auto-splitting operations and the earliest-completion-route scheduling strategy which are performed in parallel, wherein the method is performed by use of at least an electronic processor.

* * * * *